(12) United States Patent
Cha et al.

(10) Patent No.: US 9,190,664 B2
(45) Date of Patent: Nov. 17, 2015

(54) CATHODE ACTIVE MATERIAL COMPOSITION, CATHODE PREPARED BY USING THE SAME, AND LITHIUM BATTERY INCLUDING THE CATHODE

(75) Inventors: Jun-Kyu Cha, Yongin-si (KR); Seung-Hun Han, Yongin-si (KR); Hye-Sun Jeong, Yongin-si (KR); Ki-Jun Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 49 days.

(21) Appl. No.: 13/538,320

(22) Filed: Jun. 29, 2012

(65) Prior Publication Data
US 2013/0017442 A1  Jan. 17, 2013

(30) Foreign Application Priority Data

Jul. 15, 2011 (KR) .................. 10-2011-0070659

(51) Int. Cl.
| | |
|---|---|
| *H01M 4/50* | (2010.01) |
| *H01M 4/505* | (2010.01) |
| *H01M 4/131* | (2010.01) |
| *H01M 4/525* | (2010.01) |
| *H01M 4/58* | (2010.01) |
| *H01M 4/62* | (2006.01) |
| *H01M 4/04* | (2006.01) |
| *H01M 4/1391* | (2010.01) |

(Continued)

(52) U.S. Cl.
CPC .............. *H01M 4/505* (2013.01); *H01M 4/131* (2013.01); *H01M 4/525* (2013.01); *H01M 4/5825* (2013.01); *H01M 4/622* (2013.01); *H01M 4/628* (2013.01); *H01M 4/0404* (2013.01); *H01M 4/0409* (2013.01); *H01M 4/0435* (2013.01); *H01M 4/0471* (2013.01); *H01M 4/1391* (2013.01); *H01M 4/625* (2013.01); *H01M 10/052* (2013.01); *H01M 10/0525* (2013.01); *Y02E 60/122* (2013.01)

(58) Field of Classification Search
CPC ..... H01M 4/525; H01M 4/382; H01M 4/523; H01M 4/485; H01M 4/621
See application file for complete search history.

(56) References Cited

U.S. PATENT DOCUMENTS

| 5,501,924 A | 3/1996 | Swierbut et al. |
|---|---|---|
| 5,599,644 A | 2/1997 | Swierbut et al. |
| 2007/0089289 A1* | 4/2007 | Issaev et al. ................ 29/623.1 |

(Continued)

FOREIGN PATENT DOCUMENTS

| JP | 2002-198038 | 7/2002 |
|---|---|---|
| JP | 4114247 B2 | 4/2008 |

(Continued)

OTHER PUBLICATIONS

English Machine Translation of JP 4114247 B2, 35 pages.

(Continued)

*Primary Examiner* — Ula C Ruddock
*Assistant Examiner* — Scott J Chmielecki
(74) *Attorney, Agent, or Firm* — Christie, Parker & Hale, LLP

(57) ABSTRACT

A cathode active material composition includes a cathode active material, a water-based binder, and a transition metal oxide. A cathode is prepared using the cathode active material composition. A lithium battery includes the cathode. The lithium battery has improved high-rate characteristics and lifespan characteristics by preventing an increase in internal resistance due to the corrosion of an electrode base material.

16 Claims, 6 Drawing Sheets

(51) Int. Cl.
*H01M 10/052* (2010.01)
*H01M 10/0525* (2010.01)

(56) References Cited

U.S. PATENT DOCUMENTS

| | | | |
|---|---|---|---|
| 2007/0248886 A1* | 10/2007 | Shirakata et al. | 429/231.95 |
| 2010/0021821 A1* | 1/2010 | Kim et al. | 429/231.95 |
| 2010/0028773 A1* | 2/2010 | Hirota et al. | 429/203 |
| 2010/0047696 A1* | 2/2010 | Yoshida et al. | 429/322 |
| 2010/0081063 A1* | 4/2010 | Yamamoto et al. | 429/338 |
| 2010/0119947 A1 | 5/2010 | Lee et al. | |
| 2010/0173202 A1* | 7/2010 | Saito et al. | 429/224 |
| 2010/0178560 A1* | 7/2010 | Kim et al. | 429/217 |
| 2010/0330411 A1* | 12/2010 | Nam et al. | 429/156 |
| 2011/0111290 A1 | 5/2011 | Uchida et al. | |
| 2011/0136009 A1 | 6/2011 | Muthu et al. | |

FOREIGN PATENT DOCUMENTS

| | | |
|---|---|---|
| JP | 2009-170106 A | 7/2009 |
| JP | 2010-21075 A | 1/2010 |
| KR | 1997-0000136 | 1/1997 |
| KR | 1997-0004128 | 1/1997 |
| KR | 10-2007-0081558 A | 8/2007 |
| KR | 10-2010-0053758 | 5/2010 |

OTHER PUBLICATIONS

English Machine Translation of JP 2009-170106 A, 18 pages.
Patent Abstracts of Japan, and English machine translation of Japanese Publication 2002-198038 listed above, (57 pages).

* cited by examiner

Scale bar : 200μm
Magnification : X100

Scale bar : 200μm
Magnification : X100

Scale bar : 200μm
Magnification : X100

CATHODE ACTIVE MATERIAL COMPOSITION, CATHODE PREPARED BY USING THE SAME, AND LITHIUM BATTERY INCLUDING THE CATHODE

CROSS-REFERENCE TO RELATED APPLICATION

This application claims priority to and the benefit of Korean Patent Application No. 10-2011-0070659, filed on Jul. 15, 2011 in the Korean Intellectual Property Office, the entire content of which is incorporated herein by reference.

BACKGROUND

1. Technical Field

One or more embodiments of the present invention relate to cathode active material compositions, cathodes prepared from the compositions, and lithium batteries including the cathodes.

2. Description of Related Art

Recently, the demand for mobile phones and their technological development has increased, thus increasing the demand for secondary batteries as energy sources. Among these secondary batteries, lithium secondary batteries having high energy density and high voltage have become commercialized and are widely used.

A lithium secondary battery generally uses a lithium complex oxide as the cathode active material. The cathode active material is a lithium compound capable of intercalating or deintercalating lithium ions.

When an electrode plate is prepared using a water-based binder containing the cathode active material and a thickener, the electrode is strongly basic because unreacted alkali metal ions or alkali metal ions dissociated in the water present with the cathode active material increases the pH.

When a strongly basic water-based cathode active material slurry is coated on an aluminum electrode base material, the aluminum electrode base material corrodes due to the high pH, generating $H_2$ gas, generating a large number of pin holes in the electrode base material, and increasing the internal resistance of the electrode base material.

Therefore, a demand exists for cathodes that prevent increases in internal resistance by preventing corrosion of the electrode base material, and a demand exists for lithium batteries having improved high-rate characteristics and lifespan characteristics.

SUMMARY

One or more embodiments of the present invention include a cathode active material composition in which an increase in internal resistance is substantially prevented by substantially preventing the corrosion of an electrode base material.

One or more embodiments of the present invention include a cathode prepared from the cathode active material composition.

One or more embodiments of the present invention include a lithium battery having improved high-rate characteristics and lifespan characteristics by including the cathode.

Additional aspects will be set forth in part in the description which follows and, in part, will be apparent from the description, or may be learned by practice of the described embodiments.

According to one or more embodiments of the present invention, a cathode active material composition includes: a cathode active material; a water-based binder; and a transition metal oxide.

According to one or more embodiments of the present invention, a cathode is prepared by coating the cathode active material on a current collector and performing heat treatment.

According to one or more embodiments of the present invention, a cathode includes: a current collector; and a cathode active material layer formed on the current collector, wherein the cathode active material layer includes a reduced product of a transition metal oxide.

According to one or more embodiments of the present invention, a lithium battery includes: the above-described cathode; an anode; and an electrolyte.

BRIEF DESCRIPTION OF THE DRAWINGS

These and/or other aspects will become apparent and more readily appreciated from the following detailed description when considered in conjunction with the accompanying drawings in which.

DETAILED DESCRIPTION

Figure 1:
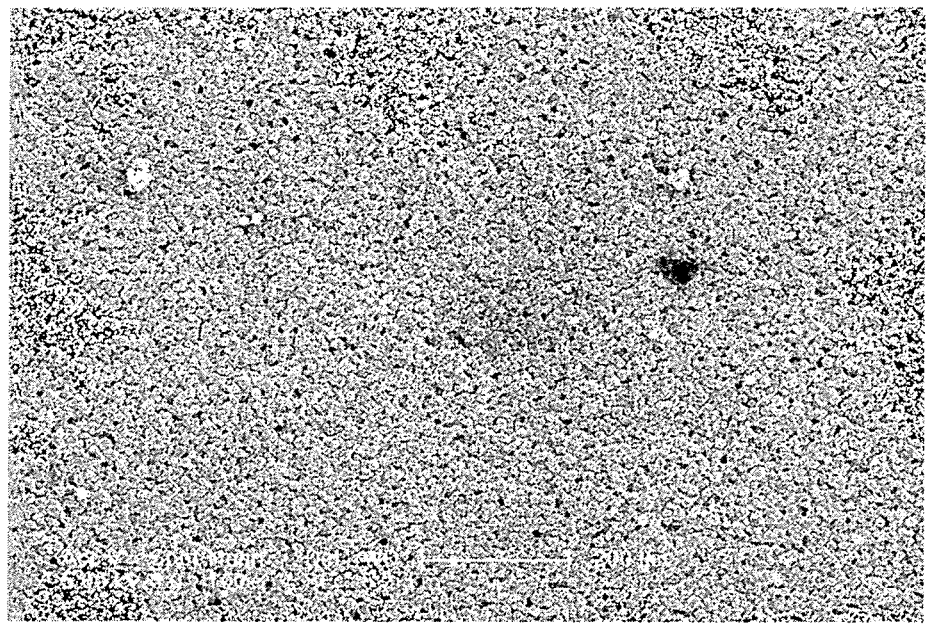
FIG. 1 is a scanning electron microscope (SEM) image of the positive plate according to Example 1.

Reference will now be made in detail to certain exemplary embodiments, examples of which are illustrated in the accompanying drawings, wherein like reference numerals refer to like elements throughout. In this regard, the present invention should not be construed as limited to the descriptions set forth herein, as the described embodiments may be modified without departing from the spirit and scope of the present invention, as would be understood by those of ordinary skill in the art. Accordingly, the described embodiments are presented with reference to the figures in order to explain and enhance the understanding of aspects of the present invention.

Hereinafter, a cathode active material composition according to an embodiment of the present invention, a cathode prepared from the same, and a lithium battery including the cathode are described in detail. However, the described embodiments are exemplary, and the present invention is not limited thereto. Instead, the scope of the present invention is defined by the scope of the appended claims.

According to an aspect of the present invention, a cathode active material composition may include a cathode active material, a water-based binder, and a transition metal oxide. The transition metal oxide may be included in the cathode active material composition as an additive.

When an electrode plate is prepared using the cathode active material and the water-based binder, the electrode is strongly basic because unreacted alkali metal ions or alkali metal ions dissociated in the water included in the cathode active material significantly increases the pH.

When a strongly basic water-based cathode active material slurry is coated on an aluminum electrode base material, the aluminum base material corrodes due to the high pH, thereby generating $H_2$ gas, generating a large number of pin holes in the electrode base material, and increasing the internal resistance of the electrode base material.

The chemical reaction that takes place when the aluminum electrode base material is corroded by an alkali is represented by the following Reaction Formula 1.

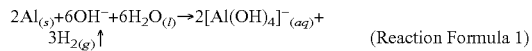　　　　　(Reaction Formula 1)

In general, a thin and dense oxide layer, $Al_2O_3$, exists on the surface of the aluminum electrode base material, and the oxide layer prevents reaction between aluminum metal and water in a neutral aqueous solution such that the reaction represented by Reaction Formula 1 does not occur. However, the oxide layer reacts with an alkaline aqueous solution such that the oxide layer elutes as aluminate ions in the solution. Thereafter, the surface of the active aluminum metal is exposed and reacts with water such that the reaction represented by Reaction Formula 1 occurs.

Therefore, when the cathode active material composition containing the water-based binder is coated on the aluminum electrode base material, the reaction represented by Reaction Formula 1 will occur. However, when a manganese-based oxide is included in the cathode active material composition, corrosion of the aluminum used as the electrode base material may be alleviated.

Examples of the manganese-based oxide may be one or more selected from MnO, $MnO_2$, $Mn_2O_3$, $Mn_3O_4$, and $Mn_2O_7$.

For example, when the manganese-based oxide is $MnO_2$, the $MnO_2$ is a strong oxidizer that reacts with aluminum metal exposed on the surface of the aluminum electrode base material. This reaction can be represented by the following Reaction Formula 2.

$$4Al + 3MnO_2 \rightarrow 2Al_2O_3 + 3Mn$$　　　　　(Reaction Formula 2)

According to Reaction Formula 2, the reaction represented in Reaction Formula 1 between aluminum metal and water is prevented, and corrosion of the aluminum base material may be prevented even in an alkaline aqueous solution. Also, the manganese-based oxide has a high intercalation voltage, is low in cost, and is harmless to the human body because it is a non-toxic material. A reduced form of the manganese-based oxide is not limited to the Mn represented in Reaction Formula 2, and may also exist as MnO, $Mn_2O_3$, or a mixture thereof. Also, when the manganese-based oxide, for example, includes one or more selected from MnO, $MnO_2$, $Mn_2O_3$, $Mn_3O_4$, and $Mn_2O_7$, the reduced form of the manganese-based oxide in Reaction Formula 2 may also exist as Mn, MnO, $Mn_2O_3$, or a mixture thereof.

The transition metal oxide may be present in an amount of about 0.01 to 5 parts by weight based on 100 parts by weight of the cathode active material, for example, about 0.1 to about 3 parts by weight, or about 0.2 to about 1 part by weight. When the cathode active material composition includes the transition metal oxide in an amount within these ranges, the aluminum is oxidized by the transition metal oxide, e.g., a manganese-based oxide and $Al_2O_3$ are formed before the aluminum of the aluminum electrode base material is corroded by $OH^-$. Therefore, the aluminum corrosion phenomena may be improved.

The pH value of the cathode active material composition may be about 11 to about 13, and for example, the pH value may be about 11 to about 12. Since the manganese-based oxide reacts as in Reaction Formula 1, when the pH value of the cathode active material is about 11 to about 13, or for example, about 11 to about 12, corrosion of the aluminum electrode base material may be alleviated when the manganese-based oxide is included in the cathode active material composition and coated on the cathode.

The cathode active material may include a compound capable of reversible intercalation and deintercalation of lithium. Nonlimiting examples of these compounds include compounds represented by any of the following chemical formulas:

$Li_aA_{1-b}X_bD_2 (0.95 \le a \le 1.1, 0 \le b \le 0.5)$ $Li_aE_{1-b}X_bO_{2-c}D_c (0.95 \le a \le 1.1, 0 \le b \le 0.5, 0 \le c \le 0.05)$ $LiE_{2-b}X_bO_{4-c}D_c (0 \le b \le 0.5, 0 \le c \le 0.05)$ $Li_aNi_{1-b-c}Co_bB_cD_\alpha (0.95 \le a \le 1.1, 0 \le b \le 0.5, 0 \le c \le 0.05, 0 < \alpha \le 2)$ $Li_aNi_{1-b-c}Co_bX_cO_{2-\alpha}M_\alpha (0.95 \le a \le 1.1, 0 \le b \le 0.5, 0 \le c \le 0.05, 0 < \alpha < 2)$ $Li_aNi_{1-b-c}Co_bX_cO_{2-\alpha}M_2 (0.95 \le a \le 1.1, 0 \le b \le 0.5, 0 \le c \le 0.05, 0 < \alpha < 2)$ $Li_aNi_{1-b-c}Mn_bX_cD_\alpha (0.95 \le a \le 1.1, 0 \le b \le 0.5, 0 \le c \le 0.05, 0 < \alpha \le 2)$ $Li_aNi_{1-b-c}Mn_bX_cO_{2-\alpha}M_\alpha (0.95 \le a \le 1.1, 0 \le b \le 0.5, 0 \le c \le 0.05, 0 < \alpha < 2)$ $Li_aNi_{1-b-c}Mn_bX_cO_{2-\alpha}M_2 (0.95 \le a \le 1.1, 0 \le b \le 0.5, 0 \le c \le 0.05, 0 < \alpha < 2)$ $Li_aNi_bE_cG_dO_2 (0.90 \le a \le 1.1, 0 \le b \le 0.9, 0 \le c \le 0.5, 0.001 \le d \le 0.1)$ $Li_aNi_bCo_cMn_dG_eO_2 (0.90 \le a \le 1.1, 0 \le b \le 0.9, 0 \le c \le 0.5, 0 \le d \le 0.5, 0 \le e \le 0.1)$ $Li_aNiG_bO_2 (0.90 \le a \le 1.1, 0.001 \le b \le 0.1)$ $Li_aCoG_bO_2 (0.90 \le a \le 1.1, 0.001 \le b \le 0.1)$ $Li_aMnG_bO_2 (0.90 \le a \le 1.1, 0.001 \le b \le 0.1)$ $Li_aMn_2G_bO_4 (0.90 \le a \le 1.1, 0 \le b \le 0.1)$ $QO_2$ $QS_2$ $LiQS_2$ $V_2O_5$ $LiV_2O_5$ $LiZO_2$ $LiNiVO_4$ $Li_{(3-f)}J_2(PO_4)_3 (0 \le f \le 2)$ $Li_{(3-f)}Fe_2(PO_4)_3 (0 \le f \le 2)$ $LiFePO_4$ lithium titanate In the above chemical formulas, A is selected from Ni, Co, Mn, and combinations thereof. X is selected from Al, Ni, Co, Mn, Cr, Fe, Mg, Sr, V, rare earth elements, and combinations thereof. D is selected from O, F, S, P, and combinations thereof. E is selected from Co, Mn, and combinations thereof. M is selected from F, S, P, and combinations thereof. G is selected from Al, Cr, Mn, Fe, Mg, La, Ce, Sr, V, and combinations thereof. Q is selected from Ti, Mo, Mn, and combinations thereof. Z is selected from Cr, V, Fe, Sc, Y, and combinations thereof. J is selected from V, Cr, Mn, Co, Ni, Cu, and combinations thereof. However, A, X, D, E, M, G, Q, Z, and J are not limited thereto.

Also, the cathode active material, for example, may include one or more selected from lithium manganese-based oxides, lithium cobalt-based oxides, lithium nickel cobalt manganese-based oxides, lithium nickel cobalt aluminium-based oxides, and olivine-type lithium iron phosphates. For example, the cathode active material may include one or more selected from $LiCoO_2$, $LiMnO_2$, $LiMn_2O_4$, $LiNi_{1-x-y}Co_xM_yO_2$ (where $0 \le x \le 1$, $0 \le y \le 1$, $0 \le x+y \le 1$, M is Al or Mn), and $LiFeO_4$. In some embodiments, for example, the cathode active material may be $LiCoO_2$ or $LiNi_{1-x-y}Co_xM_yO_2$ (where $0 \le x \le 1$, $0 \le y \le 1$, $0 \le x+y \le 1$, M is an Al or Mn metal). However, the cathode active material is not limited thereto and any cathode active material used in the related art may be used.

The water-based binder is a binder that uses water as a solvent and is economical, eco-friendly, and not harmful to the health of workers (unlike solvent-based binders). Also, the binding effect of a water-based binder is larger than that of a solvent-based binder, enabling the ratio of active material for the same volume to be increased. As a result, a high capacity lithium battery can be realized. Nonlimiting examples of the water-based binder include one or more selected from carboxymethyl cellulose, polyacrylic acid, polyvinyl alcohol, polyvinyl pyrrolidone, and hydroxypropyl cellulose. The water-based binder may be present in an amount of about 0.2 to about 10 parts by weight based on 100 parts by weight of the cathode active material.

The cathode active material composition may further include a binder using a water-based solvent. For example, the binder may include one or more selected from acryl-based copolymers, polyvinylidene fluoride (PVDF), polyethylene, polypropylene, and polytetrafluoroethylene (PTFE). However, the binder is not limited thereto and any binder known in the art may be used. Also, the binder, for example, may be an emulsion type binder. However, the binder is not limited thereto and any type of binder known in the art may be used. The binder increases the binding force of the cathode active material composition, thereby improving the binding force of the electrode plate of the lithium battery.

The cathode active material composition may further include a conductive agent. For example, the conductive agent may include one or more selected from carbon black, graphite fine particles, natural graphite, artificial graphite, acetylene black, Ketjen black, carbon fibers, carbon nanotubes, metal powders, metal fibers, metal tubes, and conductive polymers. However, the conductive agent is not limited thereto and any conductive agent known in the art may be used. The conductive agent may be present in an amount of about 0.2 to about 10 parts by weight based on 100 parts by weight of the cathode active material.

According to another aspect of the present invention, a cathode may be prepared by coating the cathode active material composition on a current collector and performing heat treatment. The current collector may include an aluminium electrode base material. For example, the above-described cathode active material composition is prepared in a slurry form by mixing the cathode active material, the water-based binder, and the transition metal oxide with a solvent. Then, the cathode may be prepared by coating the slurry on the current collector and heat treating the resultant at a temperature of about 80° C. to about 120° C. for about 5 minutes to about 1 hour. When the slurry includes the above-described cathode active material composition, the slurry is stable, processability of the coating may be improved, and the preparation is simplified, resulting in lower cost.

Also, the above-described cathode active material may be prepared in a slurry form, and then, a binder and a solvent may be further added to and mixed with the slurry. However, preparation of the cathode is not limited thereto, and any method known in the art may be used.

According to another aspect of the present invention, the cathode includes a current collector and a cathode active material layer formed on the current collector. The cathode active material layer may include a reduced product of a transition metal oxide.

The current collector may include an aluminium or copper electrode base material, and for example, may include an aluminium electrode base material. The cathode active material layer may include the above-described cathode active material, a water-based binder, and optionally a conductive agent, and may also include the reduced product of the transition metal oxide.

When the electrode plate is prepared by including the cathode active material and the water-based binder, the electrode is strongly basic due to the significant increase in pH afforded by the unreacted alkali metal ions or alkali metal ions dissociated in the water of the cathode active material. When a water-based cathode active material slurry that is strongly basic is coated on an aluminum electrode base material, the aluminum base material corrodes due to the high pH, generating $H_2$ gas, and generating a large number of pin holes in the electrode base material. Therefore, the internal resistance of the electrode base material may be increased. However, when the cathode active material includes the reduced product of the transition metal oxide, the transition metal oxide acts as an oxidizer. Therefore, the transition metal oxide oxidizes aluminium to form $Al_2O_3$ and corrosion of the aluminium electrode base material may be prevented by reduction of the transition metal oxide itself.

The transition metal oxide may be a manganese-based oxide, and for example, the manganese-based oxide may include one or more selected from MnO, $MnO_2$, $Mn_2O_3$, $Mn_3O_4$, and $Mn_2O_7$.

For example, when the transition metal oxide is $MnO_2$, the reduced product of Mn may include MnO, $Mn_2O_3$, or a mixture thereof. For example, when the transition metal oxide is MnO, the reduced product of MnO may include Mn. For example, when the transition metal oxide is $Mn_2O_3$, the reduced product of $Mn_2O_3$ may include Mn, MnO, or a mixture thereof. For example, when the transition metal oxide is $Mn_3O_4$, the reduced product of $Mn_3O_4$ may include Mn, MnO, or a mixture thereof. For example, when the transition metal oxide is $Mn_2O_7$, the reduced product of $Mn_2O_7$ may include Mn, MnO, $Mn_2O_3$, or a mixture thereof.

When the transition metal oxide is a manganese oxide and the reduced product of the manganese oxide is included in the cathode active material layer, the manganese oxide acts as a strong oxidizer to facilitate the oxidation of aluminum. Therefore, the corrosion phenomena of the electrode plate may be improved.

For example, the reduced product of $MnO_2$ may be present in an amount of about 0.01 wt % to about 5 wt % with respect to the cathode, and for example, may be present in an amount of about 0.1 wt % to about 3 wt %. When the reduced product of $MnO_2$ is present in the cathode active material layer in an amount within these ranges, the corrosion phenomena of the electrode plate due to aluminum may be improved because the aluminum is oxidized by the manganese-based oxide, and $Al_2O_3$ is formed before the aluminum in the aluminum electrode base material is corroded by $OH^-$. Therefore, a high-rate and high capacity lithium battery may be obtained.

Also, the cathode active material layer may further include a manganese-based oxide intercalated with lithium (Li). For example, the manganese-based oxide intercalated with Li may be $Li_xMnO_2$ ($0<x\leq1$). The manganese-based oxide intercalated with Li may be present in an amount of about 0.001 wt % to about 3 wt % with respect to the cathode, and for example, may be present in an amount of about 0.001 wt % to about 2 wt %. When the cathode active material layer includes the manganese-based oxide intercalated with Li in an amount within these ranges, a high-rate and high capacity lithium battery may be provided without affecting voltage during charging and discharging.

Figure 7:
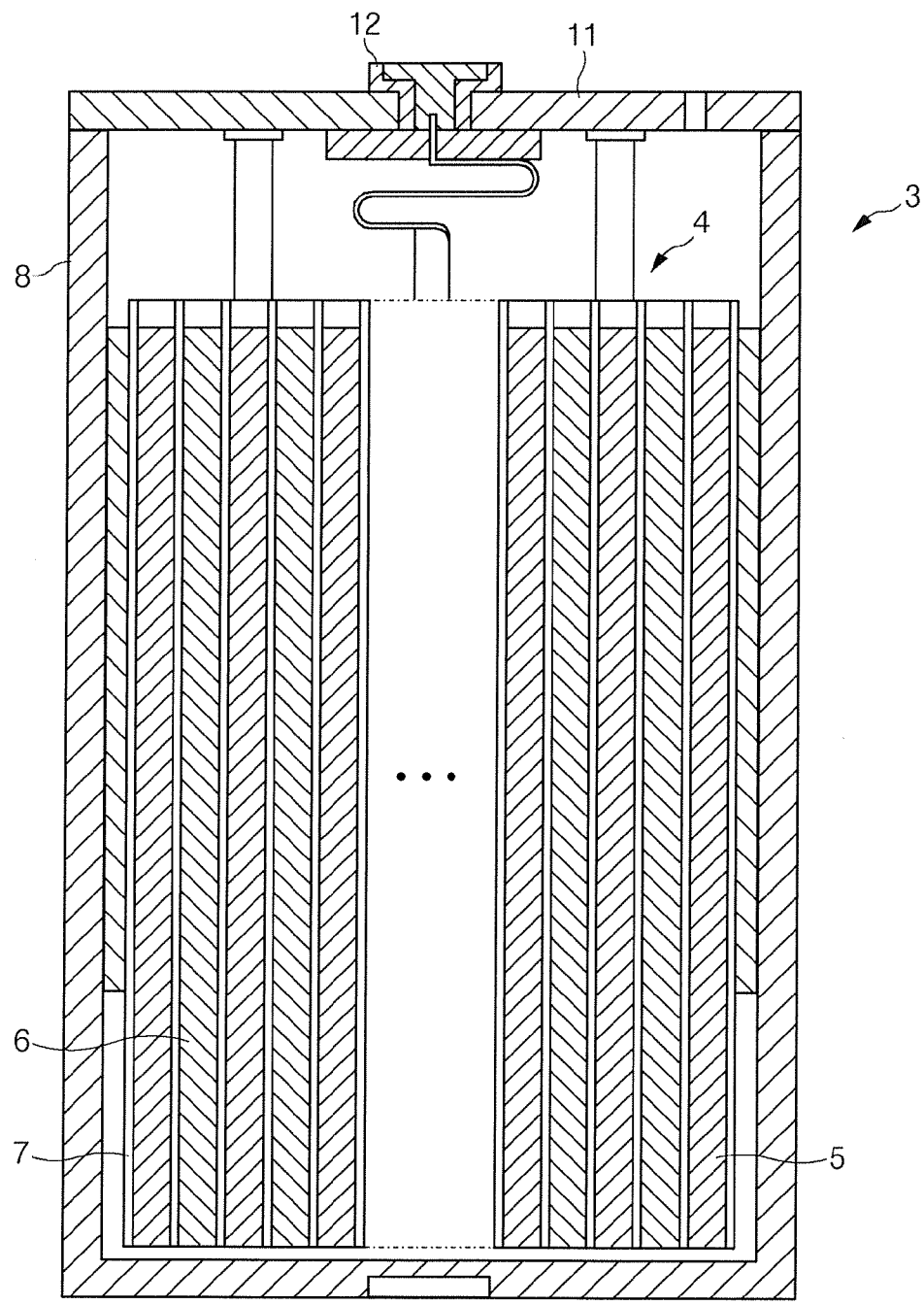
FIG. 7 is a cross-sectional view of a lithium battery according to an embodiment of the present invention.

According to another aspect of the present invention, a lithium battery may include the above-described cathode, an anode, and an electrolyte. The lithium battery including the above-described cathode may have improved high rate characteristics and capacity by preventing increases in internal resistance due to corrosion of the aluminum electrode base material. In some embodiments, for example as shown in FIG. 7, the lithium battery 3 includes an electrode assembly 4 including a cathode 5, anode 6 and a separator 7 positioned between the cathode 5 and anode 6. The electrode assembly 4 is housed in a battery case 8, and sealed with a cap plate 11 and sealing gasket 12. An electrolyte is then injected into the battery case to complete the battery.

The anode may include an anode active material layer and a current collector. Nonlimiting examples of the anode active material include natural graphite, silicon/carbon composites ($SiO_x$), silicon metal, silicon thin films, lithium metal, lithium alloys, carbon materials, and graphite. An example of the lithium alloy may be lithium titanate. The lithium titanate may include spinel-type lithium titanate, anatase-type lithium titanate, or ramsdellite-type lithium titanate (depending on the crystal structure). In particular, the anode active material may be expressed as $Li_{4-x}Ti_5O_{12}$ ($0\leq x\leq 3$). For example, the anode active material may be $Li_4Ti_5O_{12}$, but the anode active material is not limited thereto.

The binder and solvent used in the composition for forming the anode active material layer may be the same as those used for forming the cathode. A conductive agent may optionally be included in the composition for forming the anode active material layer. Nonlimiting examples of the conductive agent include one or more selected from carbon black, Ketjen black, acetylene black, artificial graphite, natural graphite, copper powders, nickel powders, aluminum powders, silver powders, and polyphenylene.

Pores may be formed in the electrode plate by further adding a plasticizer to the composition for forming the cathode active material layer and/or the composition for forming the anode active material layer.

A weight ratio of the anode active material and binder to the conductive agent, for example, may be about 98:2 to about 92:8, and a ratio of the binder to the conductive agent may be about 1.5:1 to about 3:1. However, these ratios are not limited thereto, and the ratios may be any ratios generally used in lithium secondary batteries.

The electrolyte may include a non-aqueous-based organic solvent and a lithium salt.

The non-aqueous-based organic solvent acts as the medium through which ions participating in the electrochemical reaction of a battery move.

The non-aqueous-based organic solvent may include a carbonate-based, ester-based, ether-based, ketone-based, alcohol-based, or aprotic solvent. Nonlimiting examples of the carbonate-based solvent include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and ethylmethyl carbonate (EMC). Nonlimiting examples of the ester-based solvent include methyl acetate, ethyl acetate, n-propyl acetate, dimethyl acetate, methyl propionate, ethyl propionate, γ-butyrolactone, decanolide, valerolactone, mevalonolactone, and caprolactone. Nonlimiting examples of the ether-based solvent include dibutyl ether, tetraglyme, diglyme, dimethoxyethane, 2-methyltetrahydrofuran, and tetrahydrofuran. One example of the ketone based solvent is cyclohexanone. Nonlimiting examples of the alcohol-based solvent include ethyl alcohol and isopropyl alcohol. Nonlimiting examples of the aprotic solvent include nitriles (such as R—CN in which R is a hydrocarbon group with a carbon number of 2 to 20 having a linear, branched, or cyclic structure, and may include a double-bonded aromatic ring or an ether bond), amides (such as dimethylformamide), dioxolanes (such as 1,3-dioxolane), and sulfolanes. A single non-aqueous-based organic solvent may be used or a mixture of one or more non-aqueous-based organic solvents may be used. When the non-aqueous-based organic solvent is a mixture of one or more non-aqueous-based organic solvents, the mixing ratio may be adjusted according to the targeted battery performance, and the adjustment is understood by those of ordinary skill in the art.

The lithium salt is dissolved in an organic solvent, enables the basic operation of the lithium battery by acting as a source of lithium ions in the battery, and is a material for promoting the transfer of lithium ions between the cathode and the anode. For example, the lithium salt may include at least one supporting electrolytic salt selected from $LiPF_6$, $LiBF_4$, $LiSbF_6$, $LiAsF_6$, $LiN(SO_2C_2F_6)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bis(oxalato) borate; LiBOB). The concentration of the lithium salt may be about 0.1 M to about 2.0 M. When the concentration of the lithium salt is within this range, the electrolyte may have appropriate conductivity and viscosity. Therefore, good electrolyte performance may be obtained and lithium ions may be effectively transferred.

A separator may exist between the cathode and the anode, depending on the type of lithium battery. Polyethylene, polypropylene, polyvinylidene fluoride, or a multilayer having two or more layers thereof may be used as the separator. A mixed multilayer may also be used, for example a polyethylene/polypropylene double-layered separator, a polyethylene/polypropylene/polyethylene triple-layered separator, or a polypropylene/polyethylene/polypropylene triple-layered separator.

Lithium batteries are classified as lithium-ion batteries, lithium-ion polymer batteries, or lithium polymer batteries according to the types of separator and electrolyte used. Lithium batteries are also classified as cylindrical, prismatic, coin-type, or pouch-type depending on the shape of battery. Also, lithium batteries are classified as bulk-type or thin-film type depending on size. In addition, lithium batteries can be used as both primary batteries and secondary batteries. Methods for preparing these batteries are widely known in the art.

The following Examples are presented for illustrative purposes only, and do not limit the present invention.

EXAMPLES

Preparation of Cathode

Example 1

100 parts by weight of $LiNi_{0.5}Co_{0.2}Mn_{0.3}$, 4.35 parts by weight of acetylene black, 1.09 parts by weight of carboxymethyl cellulose, and 0.6 parts by weight of $MnO_2$ were mixed with 25 parts by weight of water to form a mixture. Thereafter, 23.3 parts by weight of water and 8.15 parts by weight of an acryl-based copolymer emulsion (a solid content of about 40 wt %) were mixed with the mixture, and thus a slurry was prepared due to the mixing. The slurry was coated to a thickness of about 120 μm on an aluminium electrode base material using a doctor blade (gap: about 0.2 mm), and a positive plate with a cathode active material layer was prepared by drying the coated slurry by performing heat treatment in a vacuum at about 110° C. for about 10 minutes, and rolling.

Example 2

A positive plate was prepared in the same manner as Example 1 except that 12 parts by weight of $MnO_2$ instead of 0.6 parts by weight of $MnO_2$ was added.

Comparative Example 1

A positive plate was prepared in the same manner as Example 1 except that $MnO_2$ was not added.

Preparation of Lithium Battery

Example 3

A CR-2032 type coin cell was prepared using the positive plate prepared in Example 1, lithium metal as the counter electrode, PTFE as the separator, and a solution of 1.0 M $LiPF_6$ dissolved in ethylene carbonate (EC) and dimethylene carbonate (DMC) (at a volume ratio of about 1:1) as an electrolyte.

Example 4

A CR-2032 type coin cell was prepared in the same manner as Example 3 except that the positive plate prepared in Example 2 was used.

Comparative Example 2

A CR-2032 type coin cell was prepared in the same manner as Example 3 except that the positive plate prepared in Comparative Example 1 was used.

Evaluation of Electrode Plate and Lifespan Characteristics

Evaluation Example 1

Electrode Plate Characteristic Evaluation

Evaluation Example 1-1

Scanning Electron Microscope (SEM) Experiment

An SEM image was taken of the positive plates prepared according to Examples 1 and 2 and Comparative Example 1.

Figure 2:
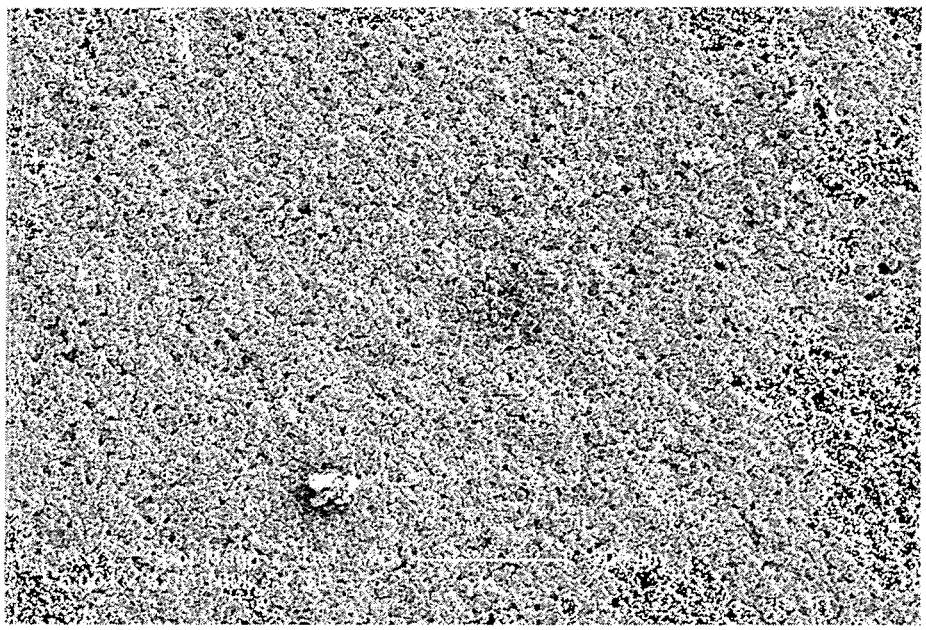
FIG. 2 is a SEM image of the positive plate according to Example 2.
Figure 3:
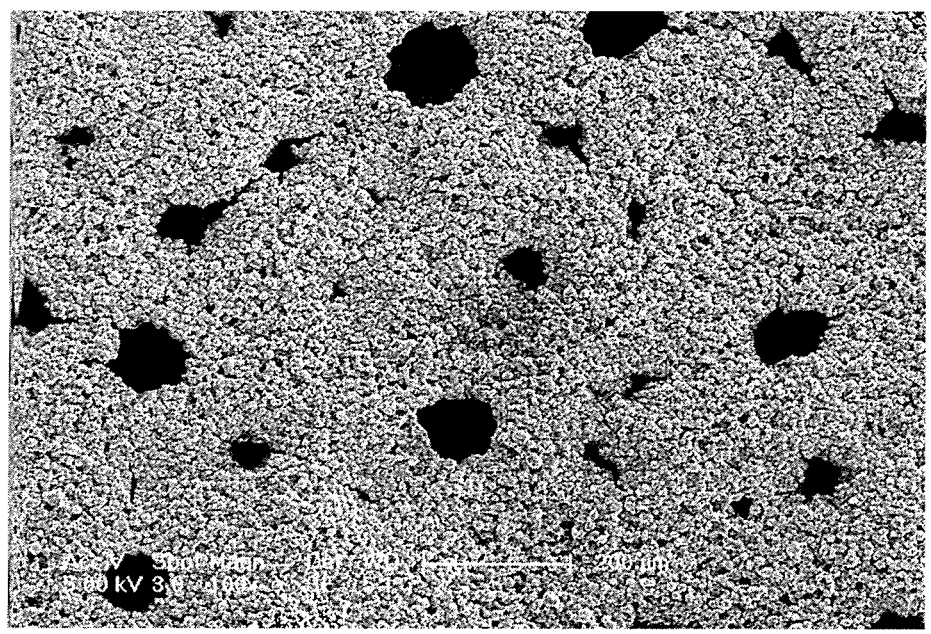
FIG. 3 is a SEM image of the positive plate according to Comparative Example 1.

The SEM micrographs are shown in FIGS. 1 through 3. As shown in FIGS. 1 and 2, pinholes due to $H_2$ gas disappeared from the surfaces of the positive plates in Examples 1 and 2.

Evaluation Example 1-2

Change Experiments of Specific Resistance and Binding Force of Electrode Plate

Changes in electrical conductivity and binding force of the positive plates prepared according to Examples 1 and 2 and Comparative Example 1 were measured using an LCR meter (Instron 3345). The measurement results are presented in Table 1 below and in FIGS. 4 and 5.

TABLE 1

|  | Binding Force (gf/mm) | Specific Resistance (S/m) |
|---|---|---|
| Example 1 | 2.1 | 8 |
| Example 2 | 1.8 | 11 |
| Comparative Example 1 | 10 | 18 |

Figure 4:
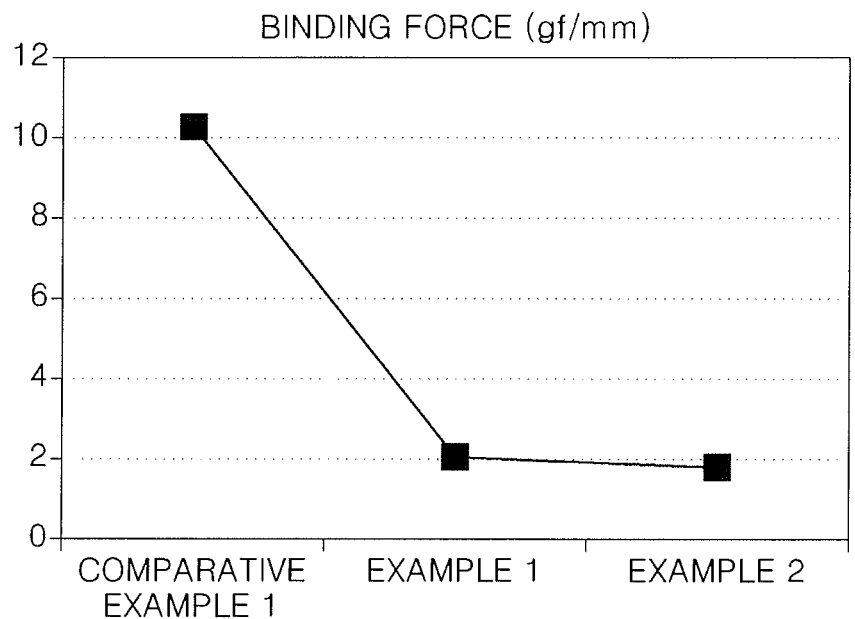
FIG. 4 is a graph comparing the binding forces of the positive plates prepared according to Examples 1 and 2 and Comparative Example 1.
Figure 5:
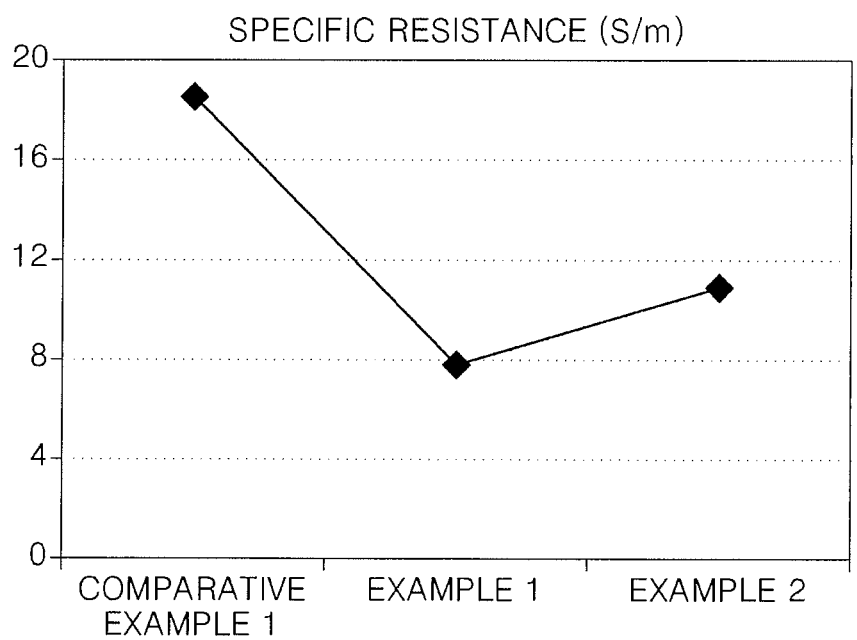
FIG. 5 is a graph comparing the specific resistances of the positive plates prepared according to Examples 1 and 2 and Comparative Example 1.

Referring to Table 1 and FIGS. 4 and 5, it can be seen that the binding forces of the positive plates prepared according to Examples 1 and 2 were kept within the range of 1.8 to 2.1, as compared to Comparative Example 1, and the specific resistances were decreased, as compared to Comparative Example 1.

Evaluation Example 2

Lifespan Characteristic Evaluation

About 70 cycles of charge and discharge were performed on the coin cells prepared according to Example 3 and 4 and Comparative Example 2. The results after one charge/discharge cycle at 0.1 C, and about 70 cycles of charge and discharge at 1 C are presented in Table 2 below and in FIG. 6.

TABLE 2

|  | Capacity after one cycle (mAh/g) | Capacity after 70 cycles (mAh/g) | Capacity Retention Ratio (%) |
|---|---|---|---|
| Example 3 | 144.9 | 126.2 | 87.1 |
| Example 4 | 143.4 | 123.6 | 86.1 |
| Comparative Example 2 | 142.7 | 117.3 | 82.2 |

Figure 6:
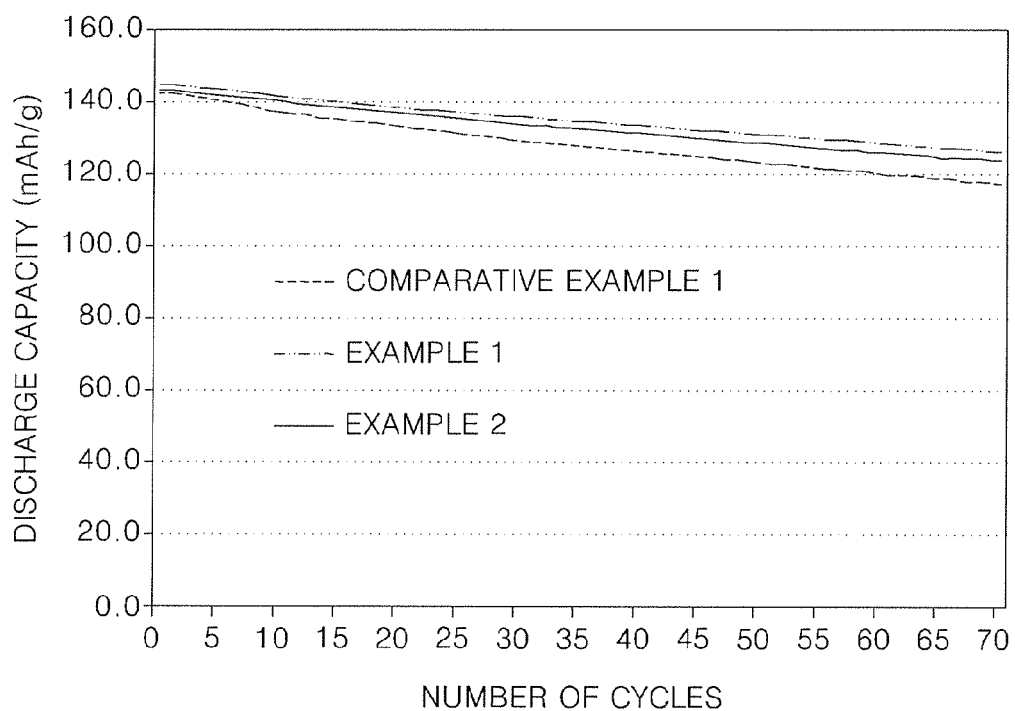
FIG. 6 is a graph comparing the lifespan characteristics of the lithium batteries prepared according to Examples 3 and 4 and Comparative Example 2.

Referring to Table 2 and FIG. 6, it can be seen that the capacity retention ratios of Examples 3 and 4 were improved as compared to Comparative Example 2. It may be understood that the high-rate characteristics and lifespan characteristics of the lithium batteries improved because the corrosion phenomena of the aluminum base electrode plate improved due to the added manganese-based oxide.

According to aspects of the present invention, a cathode active material composition, a cathode prepared from the composition, and a lithium battery including the cathode prevent increases in internal resistance due to corrosion of the electrode base material, yielding improved high-rate characteristics and lifespan characteristics of the lithium battery.

While certain exemplary embodiments have been illustrated and described, those or ordinary skill in the art will understand that various modifications and changes can be made to the described embodiments without departing from the spirit and scope of the present invention, as defined in the appended claims. Indeed, descriptions of features or aspects within each embodiment should typically be considered as available for other similar features or aspects in other embodiments.

What is claimed is:

1. A cathode active material composition comprising:
   a cathode active material comprising a material selected from the group consisting of lithium nickel cobalt manganese-based oxides, lithium nickel cobalt aluminium-based oxides, and combinations thereof;
   a water-based binder; and
   a transition metal oxide present in an amount of about 0.2 to 1 parts by weight based on 100 parts by weight of the cathode active material.

2. The cathode active material composition of claim 1, wherein the transition metal oxide comprises a manganese-based oxide.

3. The cathode active material composition of claim 2, wherein the manganese-based oxide comprises a compound selected from the group consisting of MnO, $MnO_2$, $Mn_2O_3$, $Mn_3O_4$, $Mn_2O_7$, and combinations thereof.

4. The cathode active material composition of claim 1, wherein a pH value of the cathode active material composition is about 11 to about 13.

5. The cathode active material composition of claim 1, wherein the water-based binder comprises a compound selected from the group consisting of carboxymethyl cellulose, polyacrylic acid, polyvinyl alcohol, polyvinyl pyrrolidone, hydroxypropyl cellulose, and combinations thereof.

6. The cathode active material composition of claim 1, wherein the water-based binder is present in an amount of about 0.2 to 10 parts by weight based on 100 parts by weight of the cathode active material.

7. The cathode active material composition of claim 1, wherein the cathode active material composition further comprises a conductive agent.

8. The cathode active material composition of claim 7, wherein the conductive agent comprises a material selected from the group consisting of carbon black, graphite fine particles, natural graphite, artificial graphite, acetylene black, Ketjen black, carbon fibers, carbon nanotubes, metal powders, metal fibers, metal tubes, conductive polymers, and combinations thereof.

9. The cathode active material composition of claim 7, wherein the conductive agent is present in an amount of about 0.2 to 10 parts by weight based on 100 parts by weight of the cathode active material.

10. The cathode active material composition of claim 1, wherein the cathode active material composition further comprises a second binder.

11. The cathode active material composition of claim 10, wherein the second binder comprises a material selected from the group consisting of acryl-based copolymers, polyvinylidene fluoride (PVDF), polyethylene, polypropylene, polytetrafluoroethylene (PTFE), and combinations thereof.

12. A cathode comprising:
    a current collector; and
    a cathode active material layer on the current collector, the cathode active material layer comprising:
       a cathode active material comprising a material selected from the group consisting of lithium nickel cobalt manganese-based oxides, lithium nickel cobalt aluminium-based oxides, and combinations thereof, and
       a reduced product of a transition metal oxide comprising Mn, MnO, $Mn_2O_3$, or a mixture thereof.

13. The cathode of claim 12, wherein the reduced product of the transition metal oxide is present in an amount of about 0.01 wt % to about 5 wt % with respect to the cathode.

14. The cathode of claim 12, wherein the cathode active material layer further comprises a manganese-based oxide intercalated with lithium (Li).

15. The cathode of claim 12, wherein the cathode active material layer comprising the cathode active material further comprises a water-based binder, and a conductive agent.

16. A lithium battery comprising:
    the cathode of claim 12;
    an anode; and
    an electrolyte.

* * * * *